US008332705B2

(12) United States Patent
Giancola et al.

(10) Patent No.: US 8,332,705 B2
(45) Date of Patent: Dec. 11, 2012

(54) DEVICE AND METHOD OF DATA COMBINING

(75) Inventors: Diego Giancola, Cambridge (GB); David Frank Chappaz, Cambridge (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 763 days.

(21) Appl. No.: 12/483,747

(22) Filed: Jun. 12, 2009

(65) Prior Publication Data

US 2010/0011271 A1 Jan. 14, 2010

(30) Foreign Application Priority Data

Jun. 17, 2008 (GB) .................................. 0811081.9

(51) Int. Cl.
*H04L 1/18* (2006.01)

(52) U.S. Cl. ......................... 714/748; 714/724; 714/718

(58) Field of Classification Search .................. 714/748, 714/718, 719, 724
See application file for complete search history.

(56) References Cited

U.S. PATENT DOCUMENTS

| | | | | |
|---|---|---|---|---|
| 6,162,080 | A * | 12/2000 | Treibergs et al. | 439/268 |
| 7,796,677 | B2 * | 9/2010 | Kultala | 375/147 |
| 7,941,742 | B1 * | 5/2011 | Hao et al. | 715/215 |

* cited by examiner

*Primary Examiner* — Fritz Alphonse
(74) *Attorney, Agent, or Firm* — RatnerPrestia

(57) ABSTRACT

A device and method of combining a first version of an information block and a second version of the information block is disclosed. The method comprises calculating, prior to combining the first and second versions of the information block, a scaling factor to be applied in combining the first and second versions of the information block to produce a scaled combined information block.

20 Claims, 1 Drawing Sheet

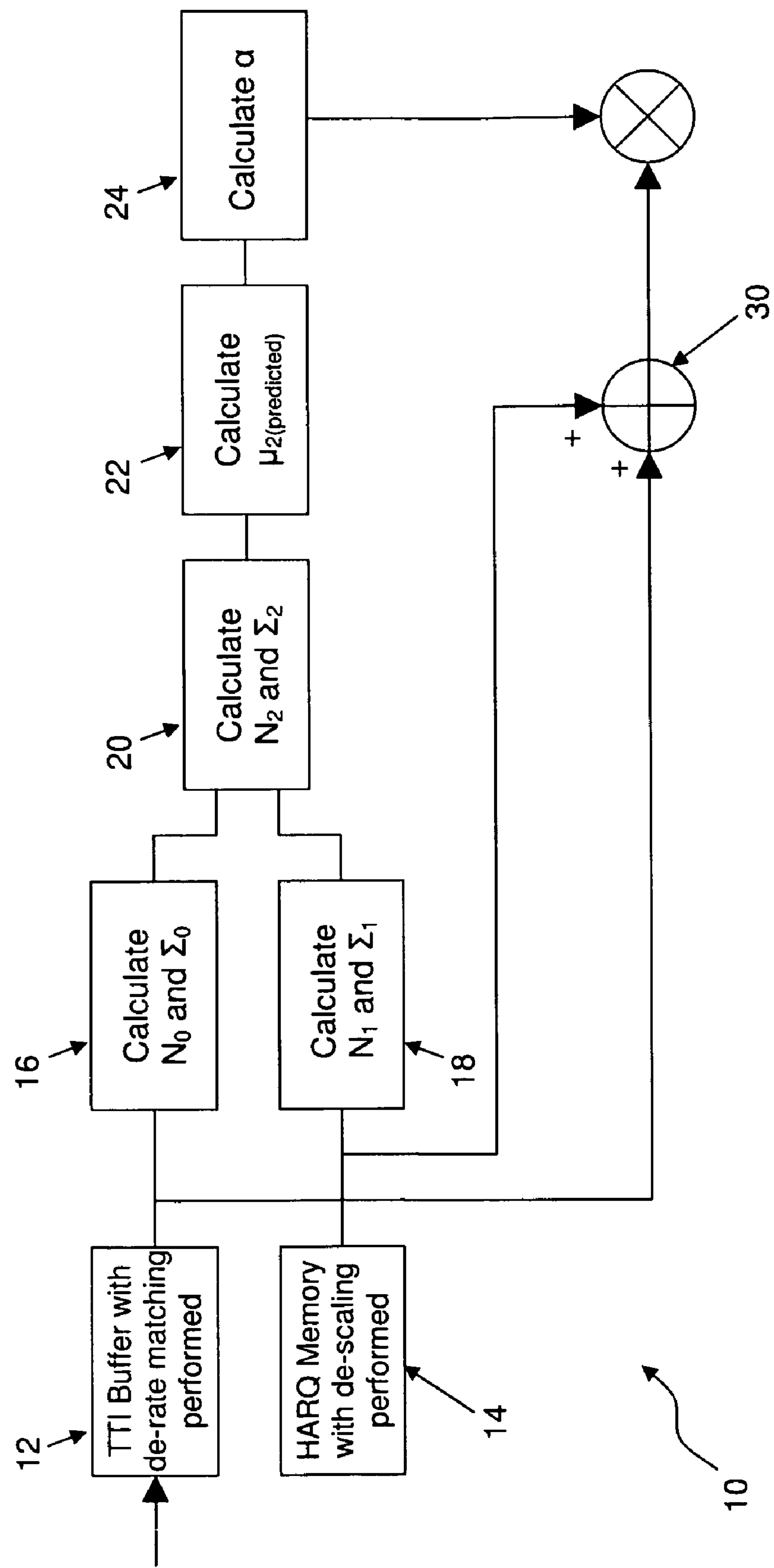
Calculate α
24
Calculate $\mu_{2(predicted)}$
22
Calculate $N_2$ and $\Sigma_2$
20
Calculate $N_0$ and $\Sigma_0$
16
Calculate $N_1$ and $\Sigma_1$
18
TTI Buffer with de-rate matching performed
12
HARQ Memory with de-scaling performed
14
+
+
30
10

DEVICE AND METHOD OF DATA COMBINING

CROSS-REFERENCE TO RELATED APPLICATIONS

This application claims the benefit of priority under 35 U.S.C. §119(a) of British Patent Application No. GB 0811081.9, filed in the U.K. Intellectual Property Office on Jun. 17, 2008, the entire disclosure of which is hereby incorporated by reference.

FIELD OF THE INVENTION

The present invention relates to a method of combining information blocks and to a receiver which employs such a method.

BACKGROUND OF THE INVENTION

Many communications systems employ a hybrid automatic repeat request (HARQ) error correction mechanism to improve the reliability of data transmissions. In a HARQ system, an encoded block of information bits that formed part of a failed transmission (as indicated by a negative result of a cyclic redundancy check (CRC), for example) is stored in a memory of a receiver, for example, as a series of soft decisions representing the information bits originally transmitted. The receiver requests re-transmission of the information block, and when the information block is re-transmitted, the encoded bits representing the raw information may adopt positions within the re-transmitted block different than those adopted when the information block was originally transmitted (i.e., the re-transmitted block may be punctured differently to the originally transmitted block). The re-transmitted encoded block received by the receiver is combined with the stored encoded block of the failed transmission in an attempt to reconstruct the transmitted information block correctly.

Combining the stored encoded block and the received re-transmitted block is achieved by a simple addition of the soft decisions contained in the two blocks. The result of such an addition can, however, occupy more bits than are occupied by each of the two soft decisions to be added, and may thus be too large to be represented accurately in the available number of bits of memory. Attempting to store a value that is too large for the available memory (known as “memory overflow”) can result in “wrapping” of the value, in which the most significant bit of the result of the addition is lost, leading to distortion of the value. Alternatively, “clipping” of the value may occur, causing the value to be limited to the maximum value that can be represented by the number of available bits of memory. For example, consider the situation where the numbers 15 and 2 are to be added, and the result is to be stored in a four bit memory. The number 15 is represented by the binary sequence 1, 1, 1, 1, while the number 2 is represented by the sequence 0, 0, 1, 0. Adding 2 to 15 gives 17, which is represented by the sequence 1, 0, 0, 0, 1. That sequence cannot be stored accurately in a four-bit memory because it requires five bits. In a system where wrapping occurs in the event of memory overflow, the sequence 0, 0, 0, 1, representing the decimal value 1, is stored, while a system that employs clipping will store the sequence 1, 1, 1, 1, representing the decimal value 15. In both cases, the value stored is different from the actual value calculated. That problem increases with each additional transmission that is required to decode the transmitted block successfully, as the size (or dynamic range) of the result of the addition of all of the failed and re-transmitted information blocks increases with each re-transmission.

In one known method, block combination is performed and a scaling factor to be applied to the combined block is selected based upon the results of the addition of the soft decisions contained in the stored and re-transmitted information blocks (i.e., after the blocks have been combined). If the result of that initial combining operation has been stored in memory, the scaling factor can be applied directly to the content of the memory. Alternatively, the combining operation is carried out again with the scaling factor applied. However, that approach requires memory (to store the result of the initial combining operation) or processing resources (to perform the combining operation twice).

SUMMARY OF THE INVENTION

Accordingly, to solve at least the problems and/or disadvantages described above, and to provide at least the advantages described below, a non-limiting object of the present invention is to provide a method of combining a first version of an information block and a second version of the information block, the method comprising calculating, prior to combining the first and second versions of the information block, a scaling factor to be applied in combining the first and second versions of the information block to produce a scaled combined information block.

By calculating the scaling factor prior to combining the first and second versions of the information block, the memory and processing resources required to perform the calculation can be reduced in comparison to known methods, as there is no need to store the result of an initial combination in a memory, and no need to perform the combination operation a second time before applying the scaling factor.

Another non-limiting object of the present invention is to provide a receiver comprising a memory for storing a first version of an information block, combining means for combining the stored first version of the information block with a received second version of the information block, and calculation means for calculating, prior to combining the first and second versions of the information block, a scaling factor to be applied in combining the first and second versions of the information block to produce a scaled combined information block.

The scaling factor may be applied to the combined information block after combining the first and second versions of the information block. Alternatively, the scaling factor may be applied to the first and second versions of the information block prior to combining them. The scaling factor may be calculated from the first version of the information block and the second version.

A limiting value may be calculated, prior to combining the first and second versions of the information block, the limiting value being derived from the first and second versions of the information block. The scaling factor may be derived from the limiting value. The limiting value may be calculated using a statistical property of the first version of the information block and the second version.

Absolute values of soft decisions of the first version of the information block and absolute values of soft decisions of the second version may be used to calculate the limiting value. A variance of values of soft decisions of the first version of the information block and a variance of values of the soft decisions of the second version may be used to calculate the limiting value.

Those and other objects of the invention, as well as many of the intended advantages thereof, will become more readily apparent when reference is made to the following description, taken in conjunction with the accompanying drawings.

BRIEF DESCRIPTION OF THE DRAWINGS

FIG. 1 is a schematic diagram showing functional blocks of part of a receiver according to a non-limiting embodiment of the present invention.

DETAILED DESCRIPTION OF THE EXEMPLARY EMBODIMENTS

Reference will now be made in detail to non-limiting embodiments of the present invention by way of reference to the accompanying drawings, wherein like reference numerals refer to like parts, components and structures. Turning to FIG. 1, a part of a receiver is shown generally at 10. It will be appreciated that the functional blocks shown in FIG. 1 are for illustrative purposes only, and do not necessarily represent actual components of a receiver.

The part of the receiver 10 comprises a TTI buffer 12 for storing a received encoded block and a HARQ memory 14 for storing a previously received encoded block forming part of a failed previous transmission. The term TTI refers to the Transmission Time Interval of an information block—that is to say, the length of time required to transmit a complete block of information. In the HSDPA system, the TTI is fixed at 2 ms.

An information block typically comprises one or more soft decisions, with each soft decision comprising a sign bit and four bits representing the magnitude of the soft decision. Conventionally, a sign bit of 0 indicates a positive soft decision value, while a sign bit of 1 indicates a negative soft decision value. A soft decision value of 0 indicates that no reliable information about the soft decision is available. The TTI buffer 12 and the HARQ memory 14 are each capable of storing a plurality of such soft decisions.

In a typical receiver employing a HARQ error correction mechanism, a received encoded block in the TTI buffer 12 is subjected to "de-rate matching" (i.e., expanded by the addition of zeroes in appropriate positions within the block or shrunk by combining several soft decisions known to correspond to the same bit), and that de-rate matched block is combined with a version of the encoded block stored in the HARQ memory 14, which has been subjected to a de-scaling operation. That combination is typically achieved by a simple addition of the soft decisions contained in the de-rate matched received encoded block and the de-scaled stored encoded block. A difficulty with that approach is that the result of such an addition can be larger than the memory available to store the result, leading to overflow of the memory and, hence, inaccurate decoding of the combined encoded block.

For example, if the HARQ memory 14 is five bits long and the value contained in the HARQ memory 14 is de-scaled to yield the bit sequence 0, 1, 0, 0, 1 (i.e., a soft decision having a value of +9) and the TTI buffer contains a received encoded block that, when subjected to de-rate matching, yields the bit sequence 0, 0, 1, 1, 1 (i.e., a soft decision having a value of +7), a simple addition of the soft decision values yields a result of 16, which requires a single sign bit and five value bits, as it is represented by the bit sequence 0, 1, 0, 0, 0, 0. Because the HARQ memory is not large enough to accommodate that result, the result may be clipped by limiting its value to the maximum it is possible to store in the HARQ memory (i.e., a value of +15) and, thus, information will be lost, possibly leading to errors in decoding the combined encoded block.

The present invention alleviates that problem by calculating, based on the soft decisions of the received encoded block and the de-scaled soft decisions of the stored version, a scaling factor that can be applied in combining the encoded blocks contained in the HARQ memory 14 and the TTI buffer 12. By scaling the combined encoded block in that way, the problem of memory overflow can be controlled.

The first step in calculating the scaling factor is to calculate a limiting value, which represents a maximum value for a soft decision that is the result of the combination of a soft decision of the stored encoded block with a corresponding soft decision of the received encoded block. The purpose of that limiting value is to ensure that the combined soft decisions of the stored and received encoded blocks fall within a limited range that can be mapped to the memory available for storing the combined soft decisions in such a way that the dynamic range of the memory available is used in the most efficient way possible, while also reducing clipping of the combined soft decisions to an acceptable level, so as not to lose a large amount of information.

The limiting value is calculated on the basis of statistical properties of the encoded blocks contained in the TTI buffer 12 and the HARQ memory 14. No meaningful information can be obtained from soft decisions of the encoded blocks having a value of zero, and, thus, in this embodiment, the mean absolute value of non-zero soft decisions contained in the encoded block stored in the HARQ memory 14 that have been de-scaled and the mean absolute value of non-zero soft decisions contained in the received encoded block in the TTI buffer 12 that have been subjected to "de-rate matching" are used in the calculation of the limiting value, although other statistical properties such as the variance or standard deviation of the absolute values of the non-zero soft decisions may be used.

In order to calculate the mean absolute value of the non-zero soft decisions contained in the TTI buffer 12 that have been subjected to de-rate matching, the total number of non-zero soft decisions yielded after the contents of the TTI buffer 12 have been subjected to de-rate matching must be counted. That is done by a calculation unit 16. Because no meaningful information can be obtained from soft decisions with a value of 0, only the soft decisions having non-zero values are counted, to give a number $N_0$ of non-zero soft decisions. The calculation unit 16 also calculates the sum $\Sigma_0$ of the absolute values of the non-zero soft decisions (i.e., the modulus of the soft decision values). And, because the value of the other soft decisions is zero, $\Sigma_0$ is the sum of the absolute values of all the soft decisions, which simplifies implementation of the calculation unit 16 because fewer logic gates are required.

A further calculation unit 18 may be provided to calculate equivalent parameters $N_1$ and $\Sigma_1$ from the stored soft decisions contained in the HARQ memory 14 after they have been de-scaled. However, it is advantageous to store those parameters together with the received encoded block in the HARQ memory 14 following a failed transmission. Thus, the parameters $N_1$ and $\Sigma_1$ may instead be retrieved from the HARQ memory 14.

As is mentioned above, the information bits in the retransmitted encoded block (received in the TTI buffer 12) may occupy positions within the encoded block different from the information bits of the encoded block of the failed transmission, which are stored in the HARQ memory 14. When the received encoded block and the stored encoded block are combined, there is a possibility that bits constituting zero-value soft decisions in one block will overlap with bits constituting non-zero value soft decisions in the other block. Thus, the theoretical maximum number $N_{2max}$ of non-zero soft decisions in the combined encoded block occurs when there is no overlap between the non-zero soft decisions of one encoded block and the non-zero soft decisions of the other encoded block, and is equal to the number $N_0$ of non-zero soft decisions in the stored block plus the number $N_1$ of non-zero soft decisions in the received re-transmitted block (i.e., $N_{2max}=N_0+N_1$). In the case where there is an overlap between the bit positions of the non-zero soft decisions of the received encoded block and the stored encoded block, the number $N_2$ of non-zero soft decisions in the combined encoded block is less than $N_{2max}$.

The value $N_{2max}=N_0+N_1$ is not a good enough approximation of the genuine $N_2$ (i.e., the actual number of non-zero soft decisions in the combined encoded block). Thus, the genuine $N_2$ must be determined by examining the contents of the HARQ memory 14 and the received encoded block after it has been subjected to de-rate matching at the same time, and counting the number of bit positions within the respective blocks where either or both of the soft decisions is non-zero.

A parameter $\Sigma_{2est}$ indicative of the sum of the absolute values of the soft decisions in the combined encoded block can be estimated. In a "worst case scenario", where there is no overlap between the bit positions of the non-zero soft decisions of the stored encoded block and the bit positions of the non-zero soft decisions of the received re-transmitted encoded block after it has been subjected to de-rate matching, $\Sigma_2=\Sigma_0+\Sigma_1=\Sigma_{2max}$. In those circumstances $N_2=N_0+N_1=N_{2max}$. $\Sigma_{2max}$ is the best available estimate for $\Sigma_2$, and thus is used as $\Sigma_{2est}$ in the calculation of the limiting value.

The parameters $N_2$ and $\Sigma_{2max}$ are calculated by a calculation unit 20 and are passed, with the parameters $\Sigma_0$ and $\Sigma_1$ to a prediction unit 22, which calculates a prediction of the mean absolute value $\mu_{2(predicted)}$ of the non-zero soft decisions of the combined block, as follows"

$$\mu_{2(predicted)}=\Sigma_{2est}/N_2=(\Sigma_0+\Sigma_1)/N_2.$$

The mean absolute value $\mu_{2(predicted)}$ of the non-zero soft decisions of the combined block may be used to derive the limiting value that sets an upper limit for the soft decisions of the encoded block produced by de-scaling the encoded block stored in the HARQ memory 14 and combining in a combining unit 30 the resulting block with the received re-transmitted encoded block contained in the TTI buffer 12 that has been subjected to de-rate matching. In that example, the limiting value is equal to twice the mean absolute value $\mu_{2(predicted)}$ of the non-zero soft decisions of the combined block, although it will be appreciated that other methods may be used to calculate the limiting value, for example, by using statistical properties such as the standard deviation of the absolute values of the soft decisions of the combined block.

To ensure that clipping of the combined encoded block occurs at the desired limiting value, so that the combined encoded block can be stored efficiently in the available memory without excessive clipping, it is necessary to apply a scaling factor $\alpha$ to the combined block. The scaling factor $\alpha$ is determined by a scaling factor calculation unit 24. The scaling factor $\alpha$ is derived from the limiting value and the amount of memory available. For example, if the limiting value is calculated as being 30 and there are 5 bits of memory in which to store each soft decision of the combined block (i.e., 4 bits for the magnitude of the soft decision and a sign bit), the scaling factor $\alpha=(2^4-1)/30=0.5$ (i.e., each soft decision of the combined block must be multiplied by 0.5 before being stored in the memory). That scaling of the soft decision values may occur after the received encoded block and the stored encoded block have been combined. Alternatively, the soft decisions of the received encoded block and the stored encoded block may be scaled prior to combining. Scaled soft decisions having non-integer values are rounded to the nearest integer value, while any scaled soft decision of the combined block having a magnitude greater than the value of the scaling factor $\alpha$ multiplied by the limiting value (i.e., 15 in this example) is clipped (i.e., its magnitude is limited). That clipping occurs "naturally" when the scaled soft decisions are stored, according to the maximum magnitude allowed by the available memory. Alternatively, the soft decisions of the combined block may be clipped prior to scaling by the scaling factor $\alpha$, in which case the clipping level is equal to the chosen limiting value.

The combined and scaled soft decisions may undergo further processing in the receiver, if it is determined (by way of a CRC check, for example) that the information block has now been correctly received, or may be stored in the HARQ memory 14, together with the scaling factor used to scale the combined soft decisions, for combining with a further re-transmitted information block, if it is determined that the information block has not been correctly received.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method, for use in a receiver of a communications system, of combining a first version of an information block and a second version of the information block, the method comprising:

calculating, by a calculation unit of the receiver, a scaling factor to be applied in combining the first and second versions of the information block; and combining, by a combining unit of the receiver, the first and second versions of the information block while applying the scaling factor to produce a scaled combined information block.

2. A method according to claim 1, wherein the scaling factor is applied to the combined information block after combining the first and second versions of the information block.

3. A method according to claim 1, wherein the scaling factor is applied to the first and second versions of the information block prior to combining them.

4. A method according to claim 1, wherein the scaling factor is calculated from the first and second versions of the information block.

5. A method according to claim 1 wherein a limiting value is calculated, prior to combining the first and second versions of the information block, the limiting value being derived from the first and second versions of the information block.

6. A method according to claim 5, wherein the limiting value is calculated using a statistical property of the first and second versions of the information block.

7. A method according to claim 5, wherein the scaling factor is derived from the limiting value.

8. A method according to claim 7, wherein the limiting value is calculated using a statistical property of the first and second versions of the information block.

9. A method according to claim 8, wherein absolute values of soft decisions of the first version of the information block and absolute values of soft decisions of the second version of the information block are used to calculate the limiting value.

10. A method according to claim 8, wherein a variance of values of soft decisions of the first version of the information block and a variance of values of the soft decisions of the second version of the information block are used to calculate the limiting value.

11. A receiver comprising:

a memory for storing a first version of an information block;

a combining means for combining the stored first version of the information block with a received second version of the information block; and a calculation means for calculating, prior to combining the first and second versions of the information block, a scaling factor to be applied in combining the first and second versions of the information block to produce a scaled combined information block.

12. A receiver according to claim 11, wherein the scaling factor is applied to the combined information block after combining the first and second versions of the information block.

13. A receiver according to claim 11, wherein the scaling factor is applied to the first and second versions of the information block prior to combining them.

14. A receiver according to claim 11, wherein the scaling factor is calculated from the first and second versions of the information block.

15. A receiver according claim 11, wherein the calculation means is configured to calculate a limiting value prior to combining the first and second versions of the information block, the limiting value being derived from the first and second versions of the information block.

16. A receiver according to claim 15, wherein the limiting value is calculated using a statistical property of the first and second versions of the information block.

17. A receiver according to claim 16, wherein the scaling factor is derived from the limiting value.

18. A receiver according to claim 17, wherein the limiting value is calculated using a statistical property of the first and second versions of the information block.

19. A receiver according to claim 18, wherein absolute values of soft decisions of the first version of the information block and absolute values of soft decisions of the second version of the information block are used to calculate the limiting value.

20. A receiver according to claim 18, wherein a variance of values of soft decisions of the first version of the information block and a variance of values of the soft decisions of the second version of the information block are used to calculate the limiting value.

* * * * *

UNITED STATES PATENT AND TRADEMARK OFFICE

CERTIFICATE OF CORRECTION

PATENT NO. : 8,332,705 B2
APPLICATION NO. : 12/483747
DATED : December 11, 2012
INVENTOR(S) : Giancola et al.

It is certified that error appears in the above-identified patent and that said Letters Patent is hereby corrected as shown below:

In the Claims

In Column 8, Line 4, in Claim 15, delete “according claim” and insert -- according to claim --, therefor.

Signed and Sealed this
Third Day of December, 2013

Margaret A. Focarino

Margaret A. Focarino
*Commissioner for Patents of the United States Patent and Trademark Office*